United States Patent [19]

Bunney

[11] Patent Number: 4,662,505
[45] Date of Patent: May 5, 1987

[54] APPARATUS FOR SEPARATING LOGS

[76] Inventor: LeRoy R. Bunney, 5008 169th Ave. SE., Bothell, Wash. 98211

[21] Appl. No.: 767,752

[22] Filed: Aug. 21, 1985

[51] Int. Cl.⁴ ............................................. B65G 47/12
[52] U.S. Cl. .................... 198/443; 198/535; 198/577
[58] Field of Search ...................... 198/443, 463.5, 535, 198/577, 560, 563, 461; 414/745, 748

[56] References Cited

U.S. PATENT DOCUMENTS

| | | |
|---|---|---|
| 245,312 | 8/1881 | Nichols . |
| 936,026 | 10/1909 | Palmowsky . |
| 2,263,811 | 11/1941 | Lipkin . |
| 2,757,704 | 8/1956 | Maddock ............................ 414/745 |
| 2,946,463 | 7/1960 | Smejda . |
| 2,999,603 | 9/1961 | Smejda . |
| 3,135,422 | 6/1964 | Woodruff . |
| 3,139,170 | 6/1964 | Schulte et al. ....................... 198/443 |
| 3,162,292 | 12/1964 | Lawson . |
| 3,214,001 | 10/1965 | Callaghan . |
| 3,254,776 | 6/1966 | Brown ................................ 414/748 |
| 3,545,589 | 12/1970 | Keller . |
| 3,581,891 | 6/1971 | Rysti . |
| 3,616,941 | 11/1971 | Walling ............................... 414/748 |
| 3,690,472 | 9/1972 | Poore et al. .......................... 198/535 |
| 3,700,120 | 10/1972 | Romick et al. . |
| 3,724,648 | 4/1973 | Schaller . |
| 3,743,114 | 7/1973 | Van Linder et al. . |
| 3,822,778 | 7/1974 | Coats . |
| 4,094,400 | 6/1978 | Braun et al. . |
| 4,232,778 | 11/1980 | Rysti ................................... 198/443 |
| 4,250,751 | 6/1980 | Rysti . |

FOREIGN PATENT DOCUMENTS

| | | |
|---|---|---|
| 2937496 | 3/1980 | Fed. Rep. of Germany . |
| 3028713 | 2/1982 | Fed. Rep. of Germany ... 198/463.5 |
| 237698 | 2/1969 | U.S.S.R. ............................. 198/443 |
| 590130 | 1/1978 | U.S.S.R. . |
| 629142 | 10/1978 | U.S.S.R. ............................. 198/560 |
| 732185 | 5/1980 | U.S.S.R. ............................. 198/535 |

OTHER PUBLICATIONS

See FIGS. 1 and 2, of U.S. Ser. No. 773,354.

Primary Examiner—Joseph E. Valenza
Assistant Examiner—D. Glenn Dayoan
Attorney, Agent, or Firm—Seed and Berry

[57] ABSTRACT

A reversible log singulating apparatus utilizing a movable infeed ramp and a rotating drum. The infeed ramp is pivotable into a downwardly pitched position for singulating logs when the apparatus is operating in a forward direction. The infeed ramp is pivotable into an upwardly pitched position to receive logs from the drum when the apparatus is operating in the reverse direction. The drum has unique flights adapted to singulate logs in a forward direction and to convey logs in the reverse direction.

11 Claims, 3 Drawing Figures

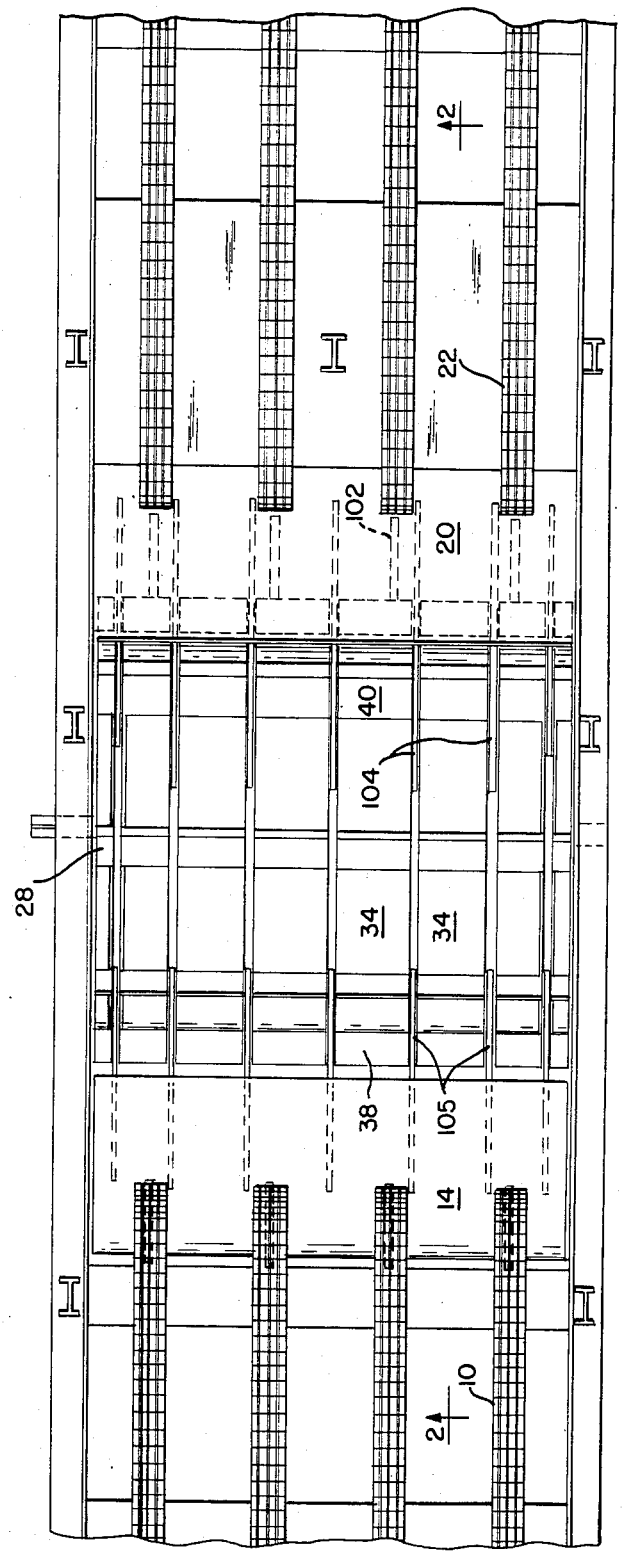

APPARATUS FOR SEPARATING LOGS

DESCRIPTION

1. Technical Field

The present invention relates to an apparatus for separating logs. More particularly, this invention relates to a revolving drum having a plurality of fixed, rigid flights projecting outwardly from the periphery of the drum. The revolving drum encounters a bundle of logs from a receiving deck and, preferably, separates a single log from the bundle to convey it singly to further processing.

2. Background of the Art

Characteristically, bundles of logs are placed on a series of conveyor chains running in substantially parallel lines. The bundle is conveyed along the chains to a stop and loader, for example, which, theoretically, feeds individual logs to a debarker. However, the large bundle of logs often makes it difficult for the loader to function properly. Sometimes the loader is unable to tip a log or it tips more than one log at a time onto the debarker conveyor. Therefore, there is particular need for a system which will ensure entry of a single log into the stop and loader so that a single log likewise may be reliably entered into the debarker. Debarking is not the only operation where isolating a single log from a bundle is important; in fact, in most log processing, separation and isolation of each log or separation into a single layer is necessary. It is also often desirable to move the logs in the reverse direction; that is to move the logs from the stop and loader end of the conveyor chains to the log receiving end of the conveyor chains. The applicant is unaware of any patents covering apparatus to isolate logs to transform a bundle of logs into a single layer and also reverse the direction of log travel when desired. However, the applicant is aware of the following five patents for sorting objects:

| Inventor | U.S. Pat. No. |
| --- | --- |
| Callaghan | 3,214,001 |
| Coats | 3,822,778 |
| Lawson | 3,162,292 |
| Rysti | 3,581,891 |
| Romick et al. | 3,700,120 |
| Rysti | 4,205,751 |

Chain unscramblers are often used to form single layers of logs in commercial lumber mills today.

DISCLOSURE OF THE INVENTION

An automatic apparatus for separating logs from a bundle, either to isolate each log or to form a single layer of logs, is valuable in log processing where, for example, the apparatus feeds logs singly to a debarker. It is often also desirable to reverse the direction of log travel such that logs at the log processing area can be returned to the log unloading area. An input conveying mechanism, such as plurality of reversible, parallel, spaced conveyor chains, receives a 100,000 to 150,000 pound bundle of logs at a processing plant. The logs are conveyed by a reversible conveying mechanism to a movable collecting ramp where a drum revolves to separate a single log from the bundle and to convey it to a second reversible conveying mechanism which feeds each log to processing equipment, such as a debarker. The drum rotation is selectively reversible.

The revolving drum has a plurality of fixed, rigid flights projecting outwardly from the periphery of the drum in longitudinal disposition parallel to the longitudinal axis of the drum. The flights form a cradle for lifting logs from the input conveying mechanism to the second conveying mechanism between a pitched surface of the flight and the periphery of the drum in which a single log may be conveyed. Preferably, the flight is pitched at an angle of about 78° with respect to the tangent of the drum at the point of contact between the pitched surface and the periphery of the drum. This angle provides a suitable cradle for most operations in separating logs. A steeply sloping support surface for the flight helps to ensure that only one log is placed in each cradle.

On certain bundles of logs, particularly of small diameter, the drum may convey multiple logs in each cradle. Still, the drum will ensure formation of a single layer of logs usually suitable for further processing at the plant.

The movable collecting ramp before the drum is selectively pitched downwardly to act as a catch for logs being conveyed to the drum or pitched upwardly to receive logs from the drum when the direction of drum rotation is reversed. Preferably, the angle of downward pitch is about 25°. When pitched downwardly at this angle, the logs will tend to fall towards the drum. When pitched upwardly, the logs will roll off the drum, away from the backside of the flight and down the ramp to the input conveyor. The design of the preferred flight of this invention will ensure that almost always only a single log is caught in the cradle when the drum is rotating in the forward feeding direction. The other logs will be bounced back to remain a part of the bundle of logs which remain in the catch. When the drum is rotating in the reverse direction, the already singulated logs are carried over the drum axis on the backside of the flights. Experience has shown that proper construction of the flight ensures more efficient isolation and separation of logs. Conventional means may be added to ensure transport of a single log in each cradle; a log kicker is preferred.

The drum for unscrambling logs weighs approximately 55,000 pounds to allow it to operate for logs up to 70 feet in length. The butt end of the logs is often much greater in diameter than the top end. Therefore, the bundle of logs in the catch is a jumble for the drum to unscramble. Also, different diameter logs may be a part of the bundle. The entire drum is preferably made from heavy gauge steel. As a center for the drum, a schedule 80 pipe forms a drive shaft. Welded to the drum are reinforced end walls to support a plate metal cylindrical sheath, which forms the outer periphery of the drum. The sheath is substantially continuous between the end walls so that logs are supported substantially along their entire length and cannot stand up and slide between the end walls. Flights having the preferred pitch are welded to the sheath. Preferably, eight flights are spaced around the periphery of the drum, the drum having a diameter of approximately 8–10 feet for most conventional operations involving logs between about 4–32 inches in diameter.

While the drum may be an individual cylinder, more commonly, it will be necessary to prepare the drum in segments. Segments are desirable because logs for processing come in many different lengths. Also, the great weight of the apparatus of this invention requires use of support and thrust bearings along the length of the drum. Finally, most log processing operations already employ a plurality of spaced, parallel conveyor chains. Therefore, it is important that the drum be adaptable for placement in existing plants. When using a segmented drum, it is important that the flights on corresponding segments be essentially co-linear with one another. Otherwise, the flights will tend to malfunction, and either no logs will be conveyed from the catch or multiple logs will be conveyed. In some circumstances, multiple logs will tend to disrupt the processing operations, such as log scanning. If a loader or other equipment jams, men must separate the logs by hand. Labor in the logging industry is expensive, and the high costs of lumber today make it essential to provide an essentially automatic means for separating logs in debarking and other logging processes. The apparatus of this invention is the most successful apparatus known for reducing the variable costs of the lumber business.

BRIEF DESCRIPTION OF THE DRAWINGS

FIG. 3 is a schematic partial top plan view of the drum and conveyor chains of the apparatus of FIG. 1.

BEST MODE FOR CARRYING OUT THE INVENTION

Figure 1:
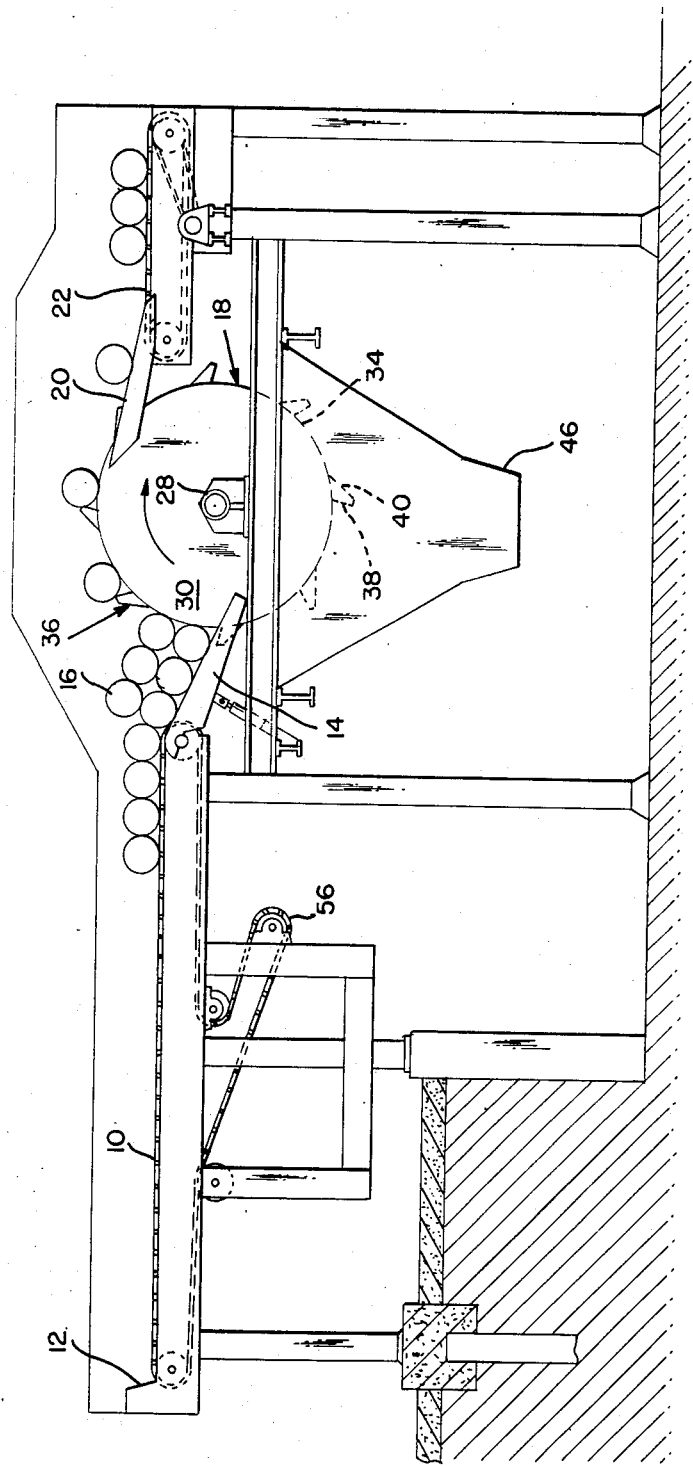
FIG. 1 is a partially schematic side elevation of an apparatus for separating logs according to this invention showing logs moving in a forward direction.
Figure 2:
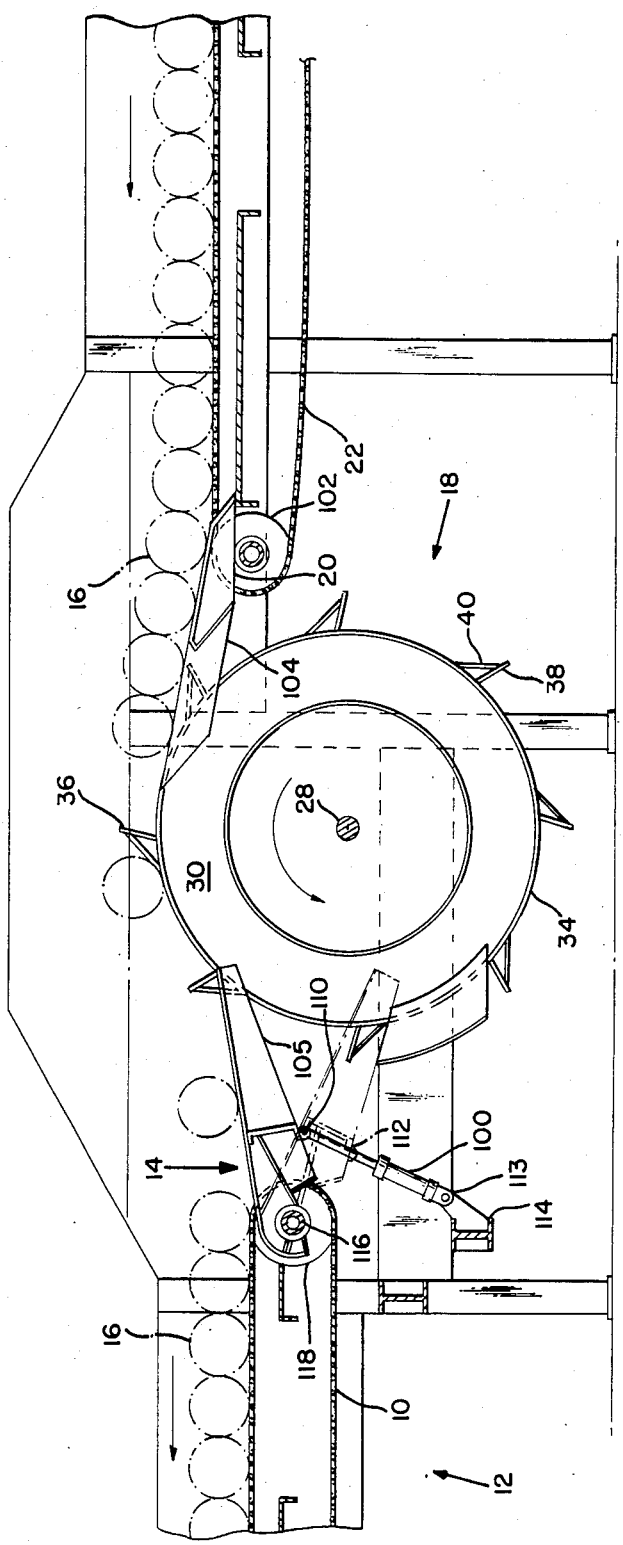
FIG. 2 is a partially schematic, partially sectional side elevational view of a preferred drum and ramp of this invention substantially taken along line 2—2 of FIG. 3, showing logs moving in a reverse direction.

As shown in FIGS. 1 and 2 a plurality of input conveyor chains 10 above a deck 12 receive a bundle of logs at a processing plant. The chains 10 are driven to convey the bundle of logs to a movable ramp 14 which can be pitched downwardly at approximately 25° from the horizontal to feed logs 16 to a clockwise rotating drum 18 or pitched upwardly to receive logs from the drum which has been reversed to rotate counterclockwise. The ramp 14 when pitched downwardly, forms a catch for the bundle of logs 16 between the conveyor chains 10 and the drum 18. The revolving drum unscrambles the logs and conveys them singly down an outfeed ramp 20 to a second set of conveying chains 22 which transports the logs in a single layer to a processing area.

The drum has a central drive shaft 28 made from schedule 80 pipe. Welded to the drive shaft 28 are a plurality of reinforced circular disks which form end walls 30 of segments of the drum. A cylindrical sheath of heavy gauge plate metal forms the outer periphery 34 of the drum and is welded to the end walls 30. The sheath is substantially continuous between the end plates to prevent butt heavy logs from tipping about one of the end walls and falling through the drum. A plurality of spaced flights 36 are welded to the outer periphery 34 of the drum 18. For sorting logs of diameters between about 4-32 inches, each flight 36 has a pitched support surface 38 angled at approximately 78° to a tangent of the drum through the point of contact between the pitched surface 38 and the periphery of the drum. The pitched surface 38 is supported by a backside 40 angled at approximately 30° to the pitched surface 38. A flight 36 of this construction provides a suitable cradle for holding a log when the drum is rotating in either direction. The drum 18 preferably is disposed over a log deck cleanup bin and conveyor 46 so that debris and dirt jostled from the bundle of logs during unscrambling are easily collected.

The drum 18 is disposed substantially perpendicular to the direction of travel of the input conveyor chains 10. Because the drum 18 may be as long as 70-75 feet and weigh as much as 55,000 pounds, it is important that the drum 18 be well supported. Therefore, it is common that the drum 18 will be made of a plurality of segments, as shown in FIG. 3. Between the segments, thrust bearings (not shown) may be used to reduce rotational friction of the drive shaft 28 and to provide support from the drum 18. A suitable rotary drive (not shown) is used to revolve the drum 18 either clockwise or counterclockwise so that unscrambling of the bundle of logs or moving singulated logs to the input conveyor chains 10 may be accomplished.

Direct conveyance of logs in the forward direction is best understood by reference to FIG. 1. The lower loop of chain 56 of the input conveyor chain 10 is used to take up slack in the chains caused by insertion of a drum 18 into a conventional log debarking process. When a bundle of logs 16 is placed on the deck 12 the input conveyor chains 10, drum 18 and second set of conveyor chains 22 rotate clockwise to move the logs to a processing area (not shown).

The drum unscrambler according to this invention singulates the logs so that only one log at a time is fed to the processing area. Rigidly constructed, the drum 18 (which forms the crux of the separating apparatus) is relatively inexpensive and automates an otherwise frustrating and expensive operation. The pitched surface 38 of the flights provide an adequate cradle for most logs encountered in processing today and are designed to convey only one log at a time. For example, for a 4-foot radius drum, a preferred flight has a pitched surface having a length approximately 9⅛-inches long. The backside 40 is approximately 12⅝-inches long on this drum. Such a flight is particularly useful in the processing of smaller diameter logs, which are more commonly being cut today. This type of flight is designed preferably to contact a single log in the catch formed by the ramp 14 when in the downwardly pitched position and to move that log upwardly while allowing other logs in the bundle to fall down in the catch along the angled backside 40. Other designs for the flight have not proven as successful.

Sometimes a flight will catch multiple logs in its cradle. When transporting the logs to a plurality of conveyor chains (as shown in the figures), conveying multiple logs often is not a problem. A single layer of logs will be formed for entry into the processing area. However, in a log scanning, for example, it is important to isolate logs with the drum 18 so that proper scanning is completed without delay. Conventional means, such as a log kicker, now used on chain unscramblers, may be incorporated into the design to ensure that, at most, only one log is conveyed by each flight. The isolated logs, then, will be maintained as isolated logs throughout further processing by such means as a lugged conveyor chain.

Conveyance of the logs in the reverse direction is best understood by reference to FIG. 2. Logs which have been fed to the second set of conveyor chains 22 by clockwise rotation of the conveyor chains and drum can be moved in the opposite direction by reversing the rotation of the chains and the drum. The ramp 14 is first moved to the upwardly, pitched position by a hydraulic actuator 100. In this position, the ramp receives logs from the counterclockwise rotating drum 18.

The outfeed ramp 20 feeds logs to the backside 40 of the flights 36. The logs force one another up the outfeed ramp due to the counterclockwise rotation of the second set of conveyor chains 22. The outfeed ramp extends upwardly from the surface of the second set of conveyor chains near the chain pulley 102 to the periphery of the drum. As best shown in FIG. 3, the outfeed ramp has slots between vertically upright fins 104 of the outfeed ramp to allow passage of the flights through the outfeed ramp as the drum is rotated. The fins extend inward of the drum periphery between the drum segments. The fins provide a continuous support surface for the logs as they move between the drum periphery and the conveyor chains 22. The movable ramp 14 has similar fins 105. The fins 104 of the outfeed ramp have a moderate upward slope from the second set of conveyor chains 22 to the drum allowing the logs to force one another up the outfeed ramp and onto the backside of the flights. The fins intersect the drum periphery at a point where the backside of the flights emerge from the fins with an upward pitch from the fins to cause the log carried thereby to roll towards the drum periphery rather than back down the ramp. That is, the backsides 40 of the flights 36 and the drum periphery provide a shallow cradle to lift the singulated logs from the outfeed ramp, over the drum axis and onto the upwardly pitched movable ramp 14. The logs then roll down the movable ramp and onto the counterclockwise rotating conveyor chains 10 as shown. In this way, the logs can be moved in a reverse direction from the processing area to the truck unloading area.

The receiving deck 12 supporting the input conveyor chains 10 is displaced somewhat above the axis of the drum 18 so that a suitable catch area can be formed when the movable ramp is pitched downwardly as shown in FIG. 1. The second set of conveyor chains 22 is displaced somewhat above the level of the receiving deck and input conveyor chains 10. This allows the outfeed ramp to have a moderate upward slope which intersects the periphery of the drum at a point where the shallow cradle formed by the backside 40 of the flights 36 can lift the logs from the outfeed ramp when rotating in the counterclockwise direction without the logs falling out of the cradle. To those skilled in the art, workable variations of these parameters will be readily apparent upon study of this disclosure and the drawings.

The hydraulic actuator 100 has one end 110 pivotally connected to a support 112 on the underside of the movable ramp 14. The other end 113 of the actuator is pinned to a frame member 114 of the machine. The movable ramp is rotatably fixed to an axle 116 supporting a set of input conveyor chain rolls 118. Thus, the extension of the hydraulic actuator raises the movable ramp to the upwardly pitched position. Deactivation of the hydraulic actuator lowers the movable ramp to the downwardly pitched position to form the catch area for the logs prior to singulation by the drum. A catch area need not be provided on the outfeed side of the machine since only singulated logs will reside on the second set of conveyor chains 22.

While discussion has focused on separating logs for a debarking operation, the drum unscrambler of this invention may be used in most log processing operations where isolation of a single log or formation of a single layer of logs is necessary. In particular, this invention is especially suited for log scanning operations prior to cutting.

I claim:

1. An apparatus for singulating a bundle of logs and for feeding the singulated logs in a forward and reverse direction, comprising:

a reversible revolving drum having a plurality of fixed flights projecting outwardly from the drum periphery, the drum being rotatable in a forward direction for singulating logs from a log bundle and also rotatable in a reverse direction for moving the singulated logs in the reverse direction;

input conveying means for reversibly conveying unsingulated logs to the drum in the forward direction and singulated logs away from the drum in the reverse direction, an end of the input conveying means toward the drum being horizontally spaced from the drum periphery and vertically spaced above the drum axis;

a movable ramp located between the input conveying means and the drum periphery, a pivotally attached end of the movable ramp being located adjacent to the input conveying means and an opposite free end of the movable ramp being located adjacent to the drum periphery;

pivoting means for pivoting the movable ramp between a downwardly pitched position and an upwardly pitched position, in the downwardly pitched position the movable ramp forms a catch area adjacent to the drum periphery for receiving logs from the input conveying means to form a log bundle in the catch area when the apparatus is operating in the forward direction, and in the upwardly pitched position the movable ramp being positioned to receive singulated logs from the drum and to guide the singulated logs to the input conveying means when the apparatus is operating in the reverse direction;

output conveying means for reversibly conveying singulated logs away from the drum in the forward direction and towards the drum in the reverse direction; and a fixed outfeed ramp for feeding singulated logs from the drum when the apparatus is operating in the forward direction and to the drum from the output conveying means when the apparatus is operating in the reverse direction, the outfeed ramp having a lower end adjacent to the output conveying means and a raised end adjacent to the drum periphery.

2. The apparatus of claim 1 wherein the flights have a forwardly facing support surface pitched at an angle of approximately 78° to the drum periphery to form a relatively deep cradle for grabbing a single log from a log bundle in the catch area when the apparatus is operating in the forward direction and wherein the flights further include a rearwardly facing backside, pitched at an angle of approximately 30° from the forwardly facing support surfce to form a relatively shallow cradle to lift a singulated log from the outfeed ramp when the apparatus is operating in the reverse direction.

3. The apparatus of claim 1 wherein the movable ramp and the outfeed ramp each have vertically oriented extension fins extending towards the drum and terminating radially inward of the drum periphery, the fins defining slots therebetween to allow the flights to pass therethrough and to form a continuous surface in the forward and reverse directions for logs moving through the apparatus.

4. The apparatus of claim 3 wherein the outfeed ramp is moderately upwardly sloped from the output conveying means to the drum periphery, the upward slope being sufficiently moderate to allow logs moving in the reverse direction to force one another up the outfeed ramp.

5. The apparatus of claim 4 wherein the outfeed ramp fins intersect the drum periphery sufficiently above the drum axis to cause the backside of the flights to have an upward pitch relative to the fins as the flights emerge from the slots so that a log carried by the backsides of the flights tends to roll towards the drum periphery.

6. The apparatus of claim 1 wherein the movable ramp pivoting means comprises a pivot at the end of the ramp adjacent to the input conveying means and a hydraulic actuator having one end pivotally fixed to a portion of the ramp and having the other end pivotally fixed to a frame portion of the apparatus.

7. The apparatus of claim 1 wherein the maximum downward pitch of the movable ramp is limited to approximately 25° from the horizontal to maximize the singulating effect of the drum on the log bundles.

8. An apparatus for singulating a bundle of logs and for feeding the singulated logs in a forward and reverse direction, comprising:
 a reversible revolving drum having a plurality of fixed flights projecting outwardly from the drum periphery, the drum being rotatable in a forward direction for singulating logs from a log bundle and also rotatable in a reverse direction for moving the singulated logs in the reverse direction;
 input conveying mens for reversibly conveying unsingulated logs to the drum in the forward direction and singulated logs away from the drum in the reverse direction,
 a movable ramp located between the input conveying means and the drum periphery;
 pivoting means for pivoting the movable ramp between a downwardly pitched position and an upwardly pitched position, in the downwardly pitched position the movable ramp forms a catch area adjacent to the drum periphery for receiving logs from the input conveying means to form a log bundle in the catch area when the apparatus is operating in the forward direction, and in the upwardly pitched position the movable ramp being positioned to receive singulated logs from the drum and to guide the singulated logs to the input conveying means when the apparatus is operating in the reverse direction;
 output conveying means for reversibly conveying singulated logs away from the drum in the forward direction and towards the drum in the reverse direction; and
 a fixed outfeed ramp for feeding singulated logs from the drum when the apparatus is operating in the forward direction and to the drum from the output conveying means when the apparatus is operating in the reverse direction.

9. The apparatus of claim 8 wherein the movable ramp and the outfeed ramp each have vertically oriented extension fins extending towards the drum and terminating radially inward of the drum periphery, the fins defining slots therebetween to allow the flights to pass therethrough and to form a continuous surface in the forward and reverse directions for logs moving through the apparatus.

10. The apparatus of claim 9 wherein the outfeed ramp fins intersect the drum periphery sufficiently above the drum axis to cause the backside of the flights to have an upward pitch relative to the fins as the flights emerge from the slots so that a log carried by the backsides of the flights tends to roll towards the drum periphery.

11. The apparatus of claim 8 wherein the movable ramp pivoting means comprises a pivot at the end of the ramp.

* * * * *